(12) United States Patent
Carlson et al.

(10) Patent No.: US 11,084,006 B2
(45) Date of Patent: Aug. 10, 2021

(54) MUD MIXER

(71) Applicant: MILWAUKEE ELECTRIC TOOL CORPORATION, Brookfield, WI (US)

(72) Inventors: Mitchell Carlson, Lisbon, WI (US); Gabriel M. Vara, Sharon, WI (US); Terry L. Timmons, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 558 days.

(21) Appl. No.: 15/919,368

(22) Filed: Mar. 13, 2018

(65) Prior Publication Data

US 2018/0272298 A1    Sep. 27, 2018

Related U.S. Application Data

(60) Provisional application No. 62/475,560, filed on Mar. 23, 2017.

(51) Int. Cl.

| | |
|---|---|
| *B01F 13/00* | (2006.01) |
| *B25G 1/00* | (2006.01) |
| *B25F 5/02* | (2006.01) |
| *B01F 15/00* | (2006.01) |
| *B01F 7/00* | (2006.01) |
| *B23B 45/00* | (2006.01) |
| *B25G 1/08* | (2006.01) |

(52) U.S. Cl.
CPC ...... *B01F 13/0028* (2013.01); *B01F 7/00583* (2013.01); *B01F 15/00519* (2013.01); *B25F 5/02* (2013.01); *B25F 5/027* (2013.01); *B25G 1/002* (2013.01); *B23B 45/006* (2013.01); *B23B 2260/004* (2013.01); *B23B 2260/024* (2013.01); *B23B 2260/062* (2013.01); *B25G 1/08* (2013.01)

(58) Field of Classification Search
CPC ....................................................... B25F 5/02
See application file for complete search history.

(56) References Cited

U.S. PATENT DOCUMENTS

| | | | |
|---|---|---|---|
| 2,545,659 A | 3/1951 | Ginter | |
| 4,779,687 A * | 10/1988 | Schreiber | B23B 45/006 |
| | | | 173/170 |
| 4,820,090 A | 4/1989 | Chen | |
| 4,998,588 A | 3/1991 | Manschitz | |
| 5,049,012 A | 9/1991 | Cavedo | |

(Continued)

FOREIGN PATENT DOCUMENTS

| | | |
|---|---|---|
| CH | 649733 A | 6/1985 |
| CN | 2576386 Y | 10/2003 |

(Continued)

*Primary Examiner* — Elizabeth Insler
(74) *Attorney, Agent, or Firm* — Michael Best & Friedrich LLP

(57) ABSTRACT

A mud mixer comprises a housing defining a battery mounting portion, an electric motor supported by the housing, a mixing element that selectively receives torque from the motor, causing the mixing element to rotate about a rotation axis, and a battery pack removably coupled to the battery mounting portion for providing power to the electric motor when coupled to the battery mounting portion. When the battery pack is coupled to the battery mounting portion, the rotation axis intersects the battery pack.

18 Claims, 9 Drawing Sheets

(56) References Cited

U.S. PATENT DOCUMENTS

| | | |
|---|---|---|
| 5,213,017 A | 5/1993 | Jones et al. |
| 5,671,815 A | 9/1997 | Kabatnik et al. |
| 5,730,232 A | 3/1998 | Mixer |
| 5,902,080 A | 5/1999 | Kopras |
| 5,996,707 A | 12/1999 | Thome et al. |
| D426,760 S | 6/2000 | Schultz |
| D431,766 S | 10/2000 | Zurwelle |
| D442,452 S | 5/2001 | Stirm et al. |
| D447,032 S | 8/2001 | Schoen et al. |
| D448,638 S | 10/2001 | Uhl et al. |
| D460,336 S | 7/2002 | Pretzell |
| 6,415,875 B1 | 7/2002 | Meixner et al. |
| 6,484,361 B1 | 11/2002 | Schmid et al. |
| D470,379 S | 2/2003 | Andriolo |
| 6,520,270 B2 | 2/2003 | Wissmach et al. |
| 6,551,525 B2 | 4/2003 | Hofmann et al. |
| 6,595,300 B2 | 7/2003 | Milbourne |
| 6,609,860 B2 | 8/2003 | Wanek et al. |
| 6,691,799 B2 | 2/2004 | Kuhnle et al. |
| D487,686 S | 3/2004 | Milbourne |
| D488,978 S | 4/2004 | Cheung |
| 6,716,095 B1 | 4/2004 | Hsu et al. |
| 6,722,449 B2 | 4/2004 | Lebisch et al. |
| 6,739,406 B2 | 5/2004 | Lebisch et al. |
| D491,438 S | 6/2004 | Cheung et al. |
| D494,033 S | 8/2004 | Thomas et al. |
| 6,814,156 B2 | 11/2004 | Dieterle et al. |
| 6,843,330 B2 | 1/2005 | Schmid et al. |
| D501,385 S | 2/2005 | Cheung et al. |
| D502,374 S | 3/2005 | Aglassinger |
| D502,375 S | 3/2005 | Aglassinger |
| D502,377 S | 3/2005 | Aglassinger |
| D503,079 S | 3/2005 | Aglassinger |
| 6,863,479 B2 | 3/2005 | Frauhammer et al. |
| 6,898,860 B2 * | 5/2005 | Wu .................. B25H 1/0092 |
| | | 33/286 |
| 6,907,942 B2 | 6/2005 | Kikuchi et al. |
| 6,913,088 B2 | 7/2005 | Berger |
| D507,950 S | 8/2005 | Aglassinger |
| D508,388 S | 8/2005 | Aglassinger |
| 6,923,271 B2 | 8/2005 | Frauhammer et al. |
| D511,286 S | 11/2005 | Aglassinger |
| 6,988,562 B2 | 1/2006 | Hecht |
| D515,382 S | 2/2006 | Andriolo |
| D515,383 S | 2/2006 | Aglassinger |
| 7,000,709 B2 | 2/2006 | Milbourne |
| D518,347 S | 4/2006 | Corcoran |
| 7,021,400 B2 | 4/2006 | Oretti |
| D520,320 S | 5/2006 | Corcoran |
| D520,833 S | 5/2006 | Andriolo |
| D521,337 S | 5/2006 | Cheung et al. |
| 7,055,620 B2 | 6/2006 | Nadig et al. |
| D525,846 S | 8/2006 | Corcoran |
| 7,137,542 B2 | 11/2006 | Oki et al. |
| D533,420 S | 12/2006 | Waldron |
| D533,421 S | 12/2006 | Aglassinger |
| 7,144,206 B2 | 12/2006 | Burger et al. |
| D534,407 S | 1/2007 | Waldron |
| D540,643 S | 4/2007 | Waldron |
| D543,819 S | 6/2007 | Lee |
| D546,154 S | 7/2007 | Fong et al. |
| 7,252,156 B2 | 8/2007 | Sugiyama et al. |
| D551,527 S | 9/2007 | Aglassinger |
| D559,059 S | 1/2008 | Concari et al. |
| 7,392,568 B2 | 7/2008 | Koschel et al. |
| 7,451,524 B2 | 11/2008 | Sattler |
| 7,578,611 B2 * | 8/2009 | Hamilton .......... B01F 15/00954 |
| | | 366/129 |
| 7,628,219 B2 | 12/2009 | Frauhammer et al. |
| 8,430,183 B2 | 4/2013 | Di Nicolantonio et al. |
| 8,448,300 B2 | 5/2013 | Imaschewski et al. |
| 8,695,223 B2 | 4/2014 | Ito |
| 8,813,866 B2 | 8/2014 | Suzuki |
| 8,984,711 B2 | 3/2015 | Ota et al. |
| 9,242,363 B2 | 1/2016 | Moessnang et al. |
| 2002/0054796 A1 | 5/2002 | Plank |
| 2002/0125022 A1 | 9/2002 | Dieterle et al. |
| 2005/0249564 A1 * | 11/2005 | Van Bergen .......... B25F 5/027 |
| | | 408/241 R |
| 2005/0284648 A1 | 12/2005 | Frauhammer et al. |
| 2006/0185867 A1 | 8/2006 | Frauhammer et al. |
| 2007/0151035 A1 | 7/2007 | Chen |
| 2011/0131817 A1 | 6/2011 | Ito |
| 2011/0162219 A1 | 7/2011 | Okouchi |
| 2012/0160534 A1 | 6/2012 | Von Saucken |
| 2013/0164589 A1 | 6/2013 | Ota et al. |
| 2014/0047722 A1 | 2/2014 | Onose et al. |
| 2015/0104250 A1 | 4/2015 | Tada et al. |
| 2015/0209952 A1 | 7/2015 | Nishii et al. |
| 2015/0263592 A1 | 9/2015 | Kawakami et al. |
| 2015/0328763 A1 | 11/2015 | Ito et al. |
| 2015/0328796 A1 | 11/2015 | Okouchi et al. |
| 2015/0333301 A1 | 11/2015 | Ota et al. |
| 2015/0366133 A1 | 12/2015 | Nojiri et al. |
| 2015/0367497 A1 | 12/2015 | Ito et al. |
| 2015/0375315 A1 | 12/2015 | Ukai et al. |
| 2015/0375416 A1 | 12/2015 | Haneda et al. |
| 2016/0176064 A1 | 6/2016 | Okouchi et al. |

FOREIGN PATENT DOCUMENTS

| | | |
|---|---|---|
| CN | 2608236 Y | 3/2004 |
| CN | 1191906 C | 3/2005 |
| CN | 2686816 Y | 3/2005 |
| CN | 1759990 A | 4/2006 |
| CN | 2936609 Y | 8/2007 |
| CN | 200977640 Y | 11/2007 |
| CN | 100371140 C | 2/2008 |
| CN | 100509303 C | 7/2009 |
| CN | 101579853 A | 11/2009 |
| CN | 101633144 A | 1/2010 |
| CN | 101186034 B | 5/2011 |
| CN | 201841532 U | 5/2011 |
| CN | 102118963 A | 7/2011 |
| CN | 102763304 A | 10/2012 |
| CN | 102812612 A | 12/2012 |
| CN | 202622744 U | 12/2012 |
| CN | 101224572 B | 3/2013 |
| CN | 202846501 U | 4/2013 |
| CN | 203566795 U | 4/2014 |
| CN | 203944874 U | 11/2014 |
| CN | 104174896 A | 12/2014 |
| CN | 104552185 A | 4/2015 |
| CN | 102118962 B | 5/2015 |
| CN | 102114626 B | 6/2015 |
| CN | 102092038 B | 7/2015 |
| CN | 104816288 A | 8/2015 |
| CN | 104924279 A | 9/2015 |
| CN | 204621994 U | 9/2015 |
| CN | 2014621995 U | 9/2015 |
| CN | 104985573 A | 10/2015 |
| CN | 207707799 U | 8/2018 |
| DE | 7927713 U1 | 3/1981 |
| DE | 3610221 C1 | 10/1987 |
| DE | 4204420 A1 | 8/1993 |
| DE | 19606498 A1 | 8/1997 |
| DE | 29623526 U1 | 10/1998 |
| DE | 10006042 A1 | 8/2001 |
| DE | 10106050 A1 | 8/2002 |
| DE | 20200400502 U1 | 11/2004 |
| DE | 102006055516 A1 | 5/2008 |
| DE | 102007039245 A1 | 5/2008 |
| DE | 102006056854 A1 | 6/2008 |
| DE | 102008040570 A1 | 1/2010 |
| DE | 102008043379 A1 | 5/2010 |
| DE | 102008044117 A1 | 6/2010 |
| DE | 102009002463 A1 | 10/2010 |
| DE | 102009047705 B4 | 6/2011 |
| DE | 102010063885 A1 | 6/2012 |
| DE | 102004016088 B4 | 7/2012 |
| DE | 202013103656 U1 | 9/2013 |
| DE | 202011110568 U1 | 10/2014 |
| DE | 102014014693 A1 | 4/2015 |

(56) References Cited

FOREIGN PATENT DOCUMENTS

| | | |
|---|---|---|
| EP | 0238718 B1 | 4/1990 |
| EP | 0791436 A1 | 8/1997 |
| EP | 1202829 B1 | 10/2004 |
| EP | 1595655 A1 | 11/2005 |
| EP | 1075914 B1 | 10/2007 |
| EP | 1707323 B1 | 9/2008 |
| EP | 1731278 B1 | 7/2009 |
| EP | 1997592 B1 | 9/2010 |
| EP | 2311304 A1 | 4/2011 |
| EP | 1882560 B1 | 6/2011 |
| EP | 2332696 A2 | 6/2011 |
| EP | 2468461 A2 | 6/2012 |
| EP | 2241408 B1 | 8/2012 |
| EP | 1514648 B1 | 11/2013 |
| EP | 2322027 B1 | 12/2013 |
| EP | 2340916 B1 | 5/2015 |
| EP | 2910344 A2 | 8/2015 |
| EP | 2946888 A1 | 11/2015 |
| EP | 2952083 A1 | 12/2015 |
| EP | 2952306 A1 | 12/2015 |
| EP | 2534744 B1 | 5/2016 |
| ES | 2347396 BB | 5/2011 |
| FR | 2847183 B3 | 5/2004 |
| GB | 2395457 B2 | 2/2006 |
| GB | 2444401 B2 | 7/2009 |
| GB | 2444160 B2 | 11/2009 |
| GB | 2444169 B2 | 9/2010 |
| GB | 2461992 B2 | 8/2012 |
| GB | 2489356 B2 | 2/2013 |
| WO | WO 01/58630 A1 | 8/2001 |
| WO | WO 2010/018718 A1 | 2/2010 |
| WO | WO 2010/018719 A1 | 2/2010 |
| WO | WO 2011/099348 A1 | 8/2011 |
| WO | WO 2011/099349 A1 | 8/2011 |
| WO | WO 2014/119131 A1 | 8/2014 |
| WO | WO 2014/119135 A1 | 8/2014 |
| WO | WO 2014/119174 A1 | 8/2014 |
| WO | WO 2014/119188 A1 | 8/2014 |
| WO | WO 2014/119210 A1 | 8/2014 |
| WO | WO 2014/119211 A1 | 8/2014 |
| WO | WO 2014/119732 A1 | 8/2014 |
| WO | WO 2014/119733 A1 | 8/2014 |

\* cited by examiner

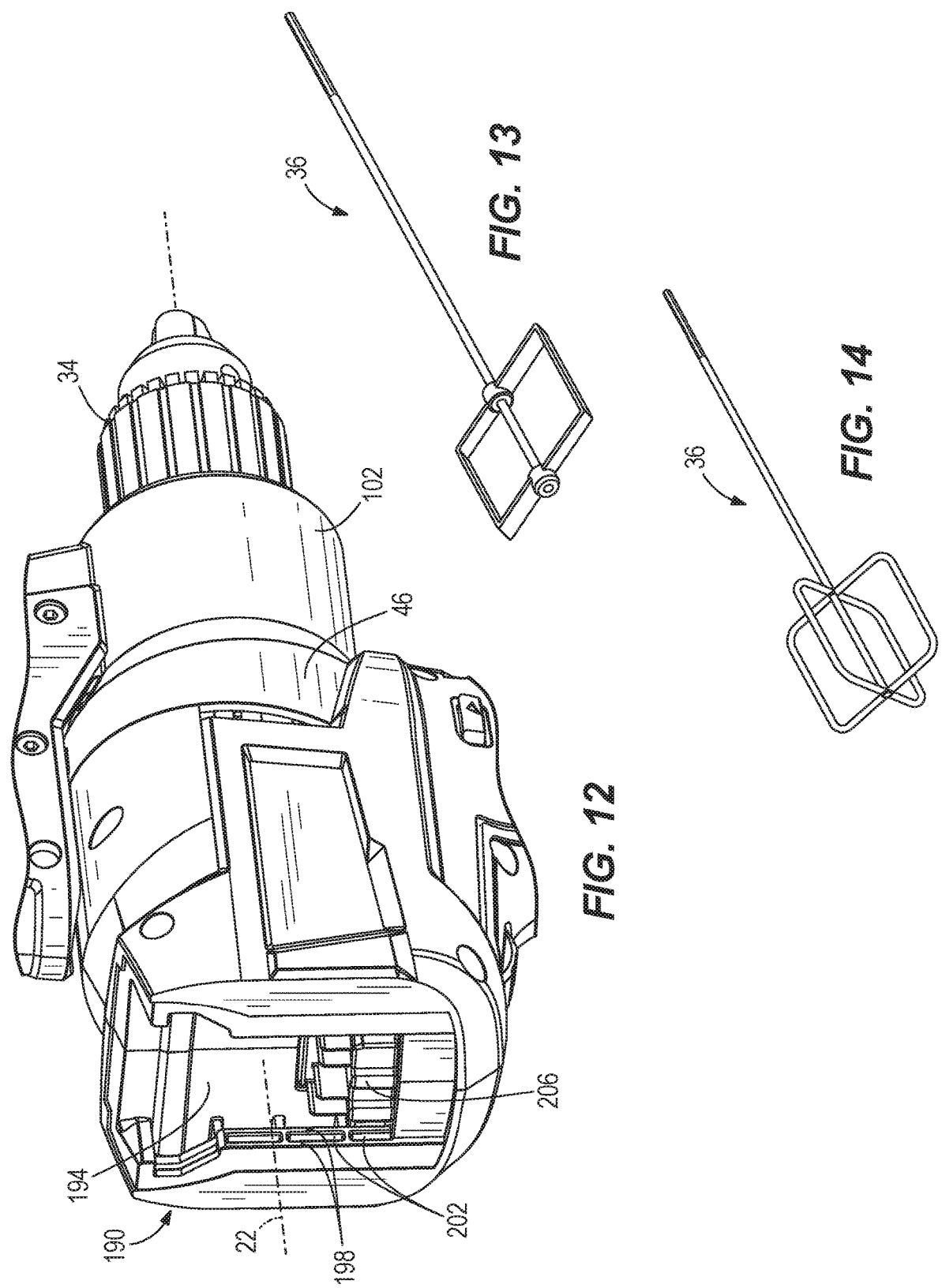

:
MUD MIXER

CROSS-REFERENCE TO RELATED APPLICATIONS

This application claims priority to U.S. Provisional Patent Application No. 62/475,560 filed on Mar. 23, 2017, the entire content of which is incorporated herein by reference.

FIELD OF THE INVENTION

The present invention relates to power tools, and more particularly to mud mixing power tools.

BACKGROUND OF THE INVENTION

When using a mud mixer, an operator can use multiple handles to securely grasp and orient the mud mixer. A chuck key is used to adjust a chuck of the mud mixer. A battery pack is mounted on a battery mounting portion of the mud mixer.

SUMMARY OF THE INVENTION

The invention provides, in one aspect, a mud mixer comprising a housing defining a battery mounting portion, an electric motor supported by the housing, a mixing element that selectively receives torque from the motor, causing the mixing element to rotate about a rotation axis, and a battery pack removably coupled to the battery mounting portion for providing power to the electric motor when coupled to the battery mounting portion. When the battery pack is coupled to the battery mounting portion, the rotation axis intersects the battery pack.

The invention provides, in another aspect, a mud mixer comprising a housing, an electric motor supported by the housing, a mixing element that selectively receives torque from the motor, causing the mixing element to rotate about a rotation axis, a first handle coupled to the housing and defining a handle axis, and a second handle moveably coupled to the housing and moveable between a first position, in which the second handle is arranged along the handle axis, and a second position, in which second handle is not arranged along the handle axis.

The invention provides, in yet another aspect, a mud mixer comprising, a housing, an electric motor supported by the housing, a chuck that selectively receives torque from the motor, causing the chuck to rotate, the chuck configured to hold a mixing element, a handle coupled to the housing, the handle including a retention mechanism and a chuck key for tightening and loosening the chuck. The chuck key is selectively retained in the handle by the retention mechanism.

Other features and aspects of the invention will become apparent by consideration of the following detailed description and accompanying drawings.

BRIEF DESCRIPTION OF THE DRAWINGS

FIG. 12 is a rear perspective view of the mud mixer of FIG. 1.

FIG. 13 is a mixing element for use with the mud mixer of FIG. 1.

FIG. 14 is another embodiment of a mixing element for use with the mud mixer of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
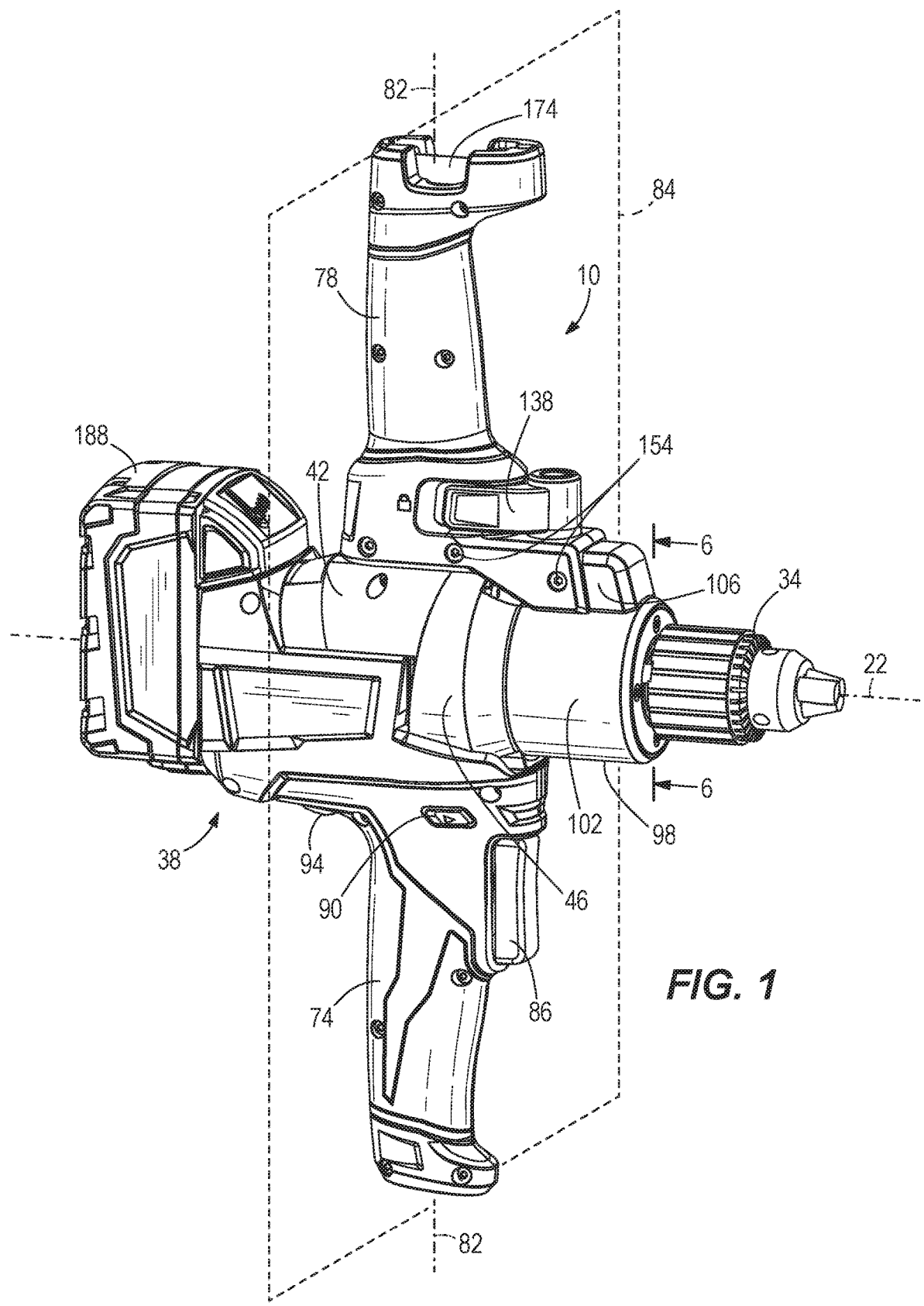
FIG. 1 is perspective view of a mud mixer.
Figure 2:
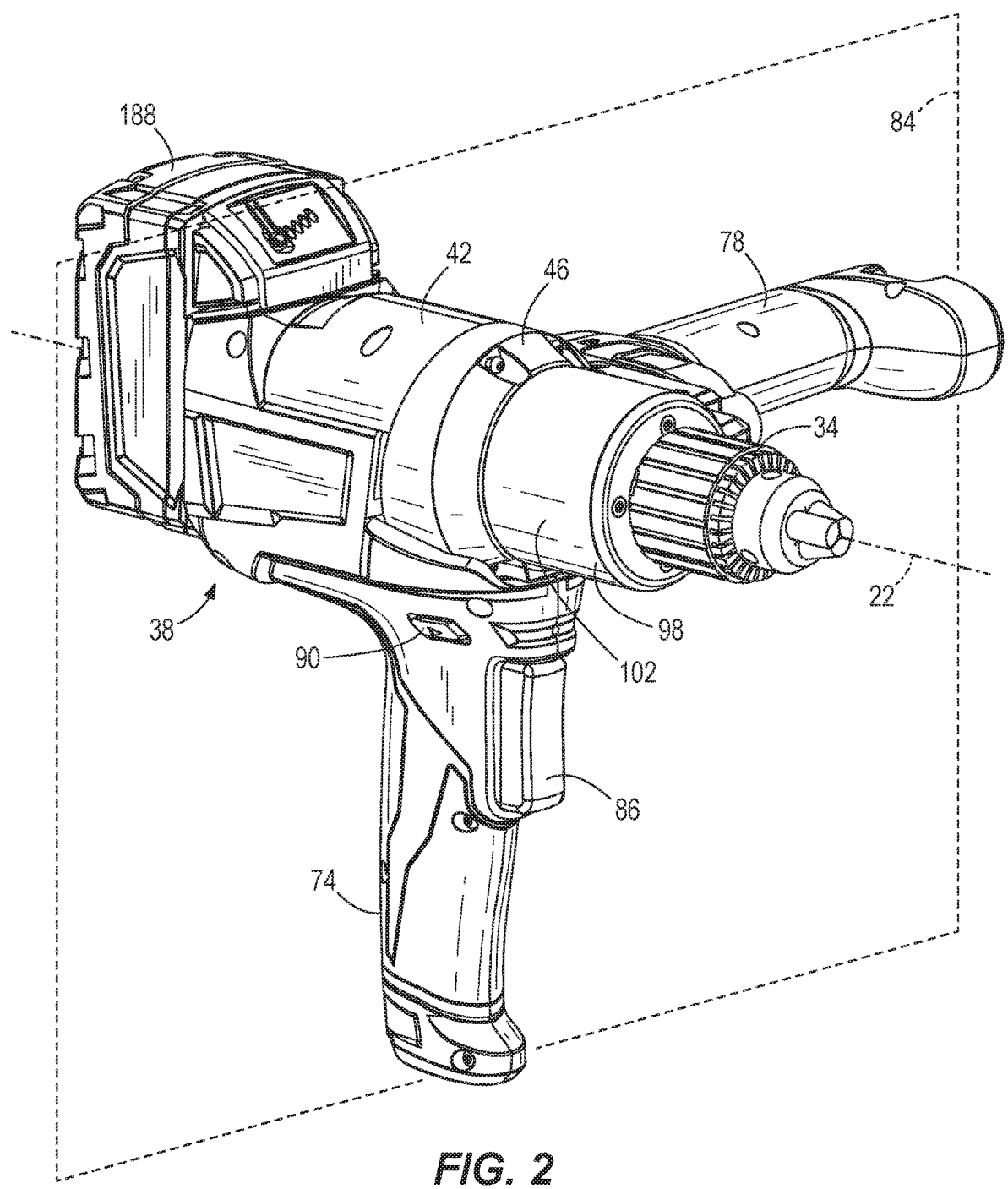
FIG. 2 is another perspective view of the mud mixer of FIG. 1, with a second handle moved to a second position with respect to a body.
Figure 3:
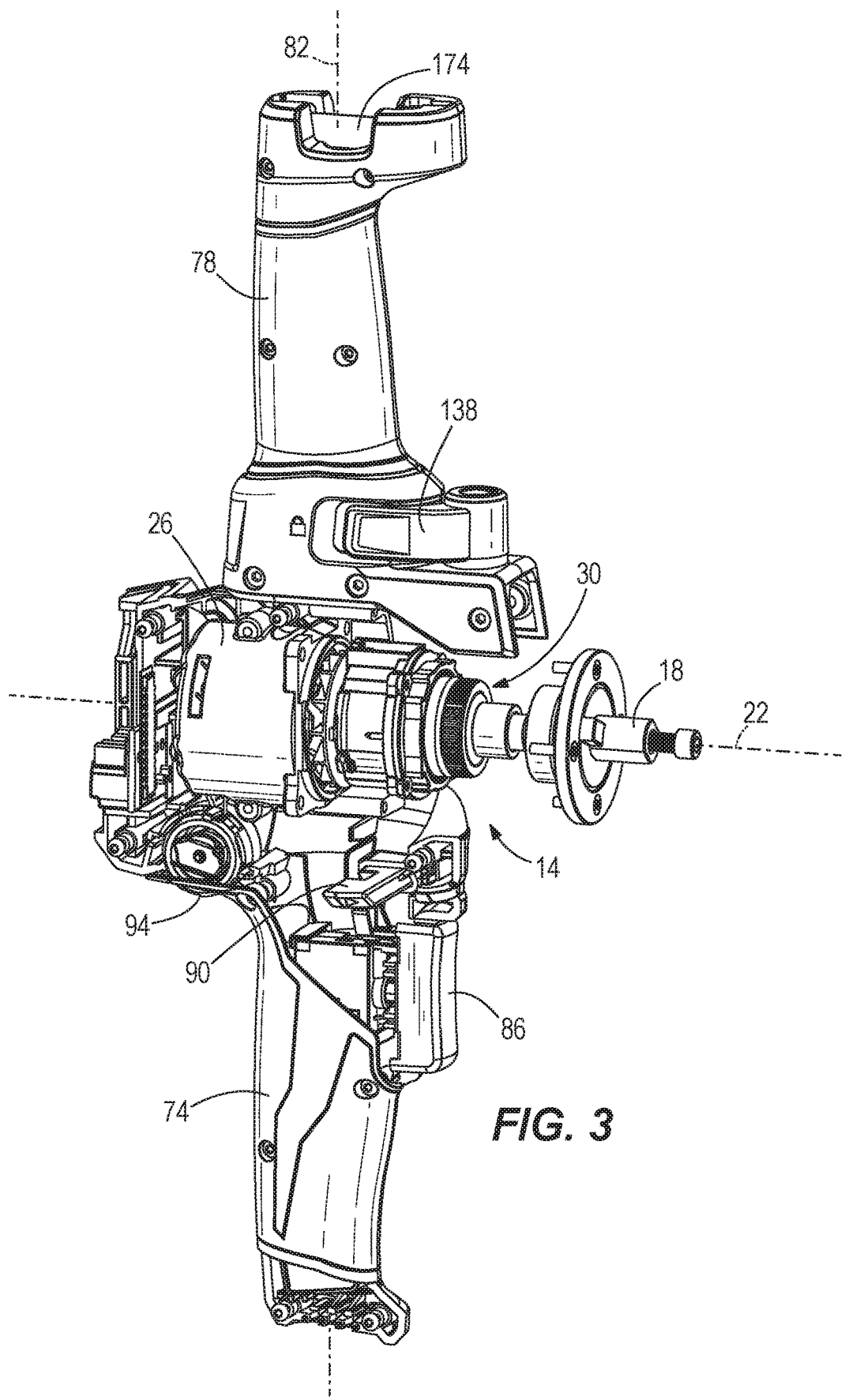
FIG. 3 is a perspective view of the mud mixer of FIG. 1, with portions removed.

With reference to FIGS. 1-3, a rotary power tool, such as a mud mixer 10, includes a drive mechanism 14 and a spindle 18 rotatable about a rotational axis 22 in response to receiving torque from the drive mechanism 14. As shown in FIG. 3, the drive mechanism 14 includes an electric motor 26 and a multi-stage transmission 30 between the motor 26 and the spindle 18. The multi-stage transmission 30 rotates the spindle 18 at one speed, but in other embodiments is capable of rotating the spindle 18 at more than one speed. A chuck 34 surrounds and is coupled for rotation with the spindle 18. The chuck 34 is configured to hold a mixing element 36 for mud mixing, such as a bit or a paddle as shown in FIGS. 13 and 14. The mixing element 36 can be two sided as shown in FIG. 13 or four sided as shown in FIG. 14.

Figure 5:
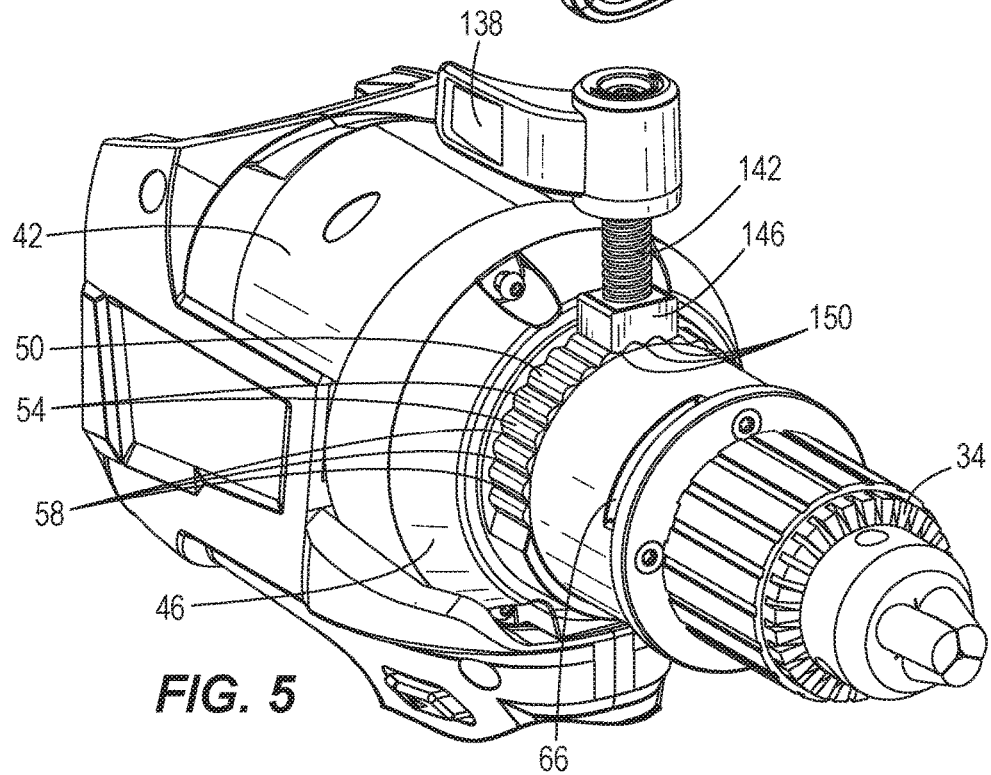
FIG. 5 is an enlarged perspective view of the mud mixer of FIG. 1, with a collar removed.
Figure 6:
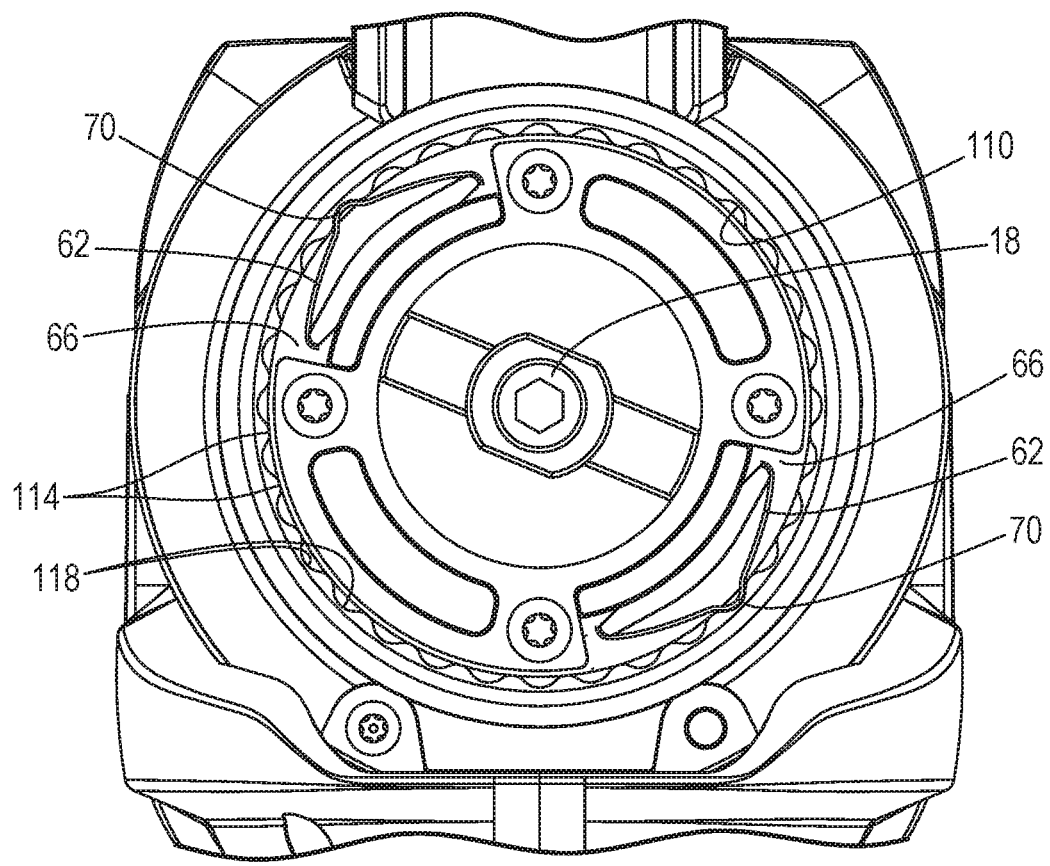
FIG. 6 is an enlarged front plan view of the mud mixer of FIG. 1, with a chuck removed.

The mud mixer 10 has a tool body 38 that includes a main housing 42 to encase the motor 26 and a gear case 46 to encase the transmission 30. As shown in FIG. 5, the exterior of the gear case 46 includes a toothed portion 50 including peaks 54 (e.g., ribs) and valleys 58 (e.g., recesses) that extends slightly more than 180 degrees around the circumference of the gear case 46. The gear case 46 also includes biasing members 62 (shown only in FIG. 6), such as leaf springs, set in circumferential recesses 66 (FIGS. 5 and 6) and biased radially outward. Each biasing member 62 includes a nipple or protrusion 70. In the illustrated embodiment, two biasing members 62 are used; however, in further embodiments fewer or more biasing members may be used.

Figure 15:
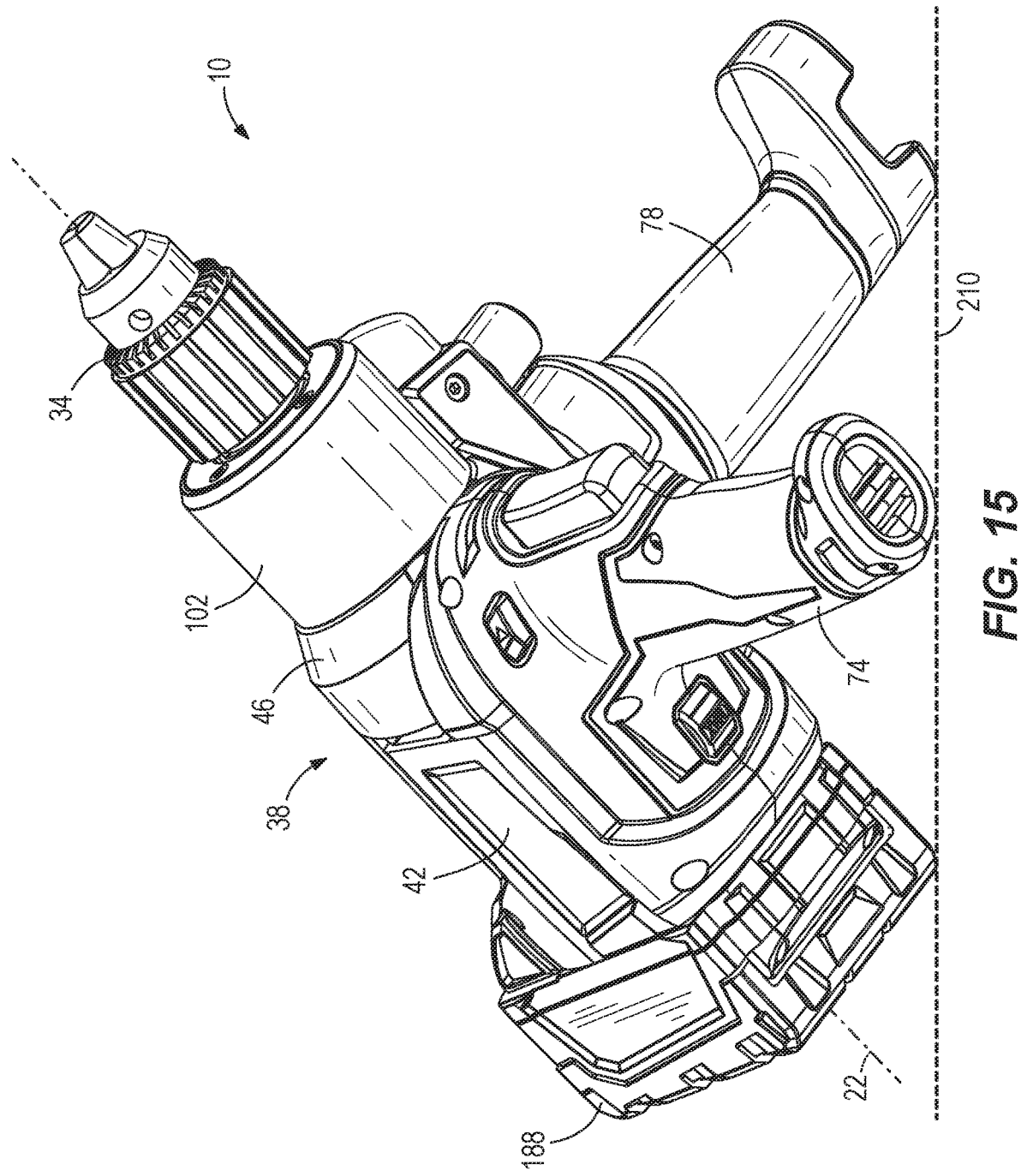
FIG. 15 is a perspective view of the mud mixer of FIG. 1 with a first handle, a second handle, and a battery pack contacting a support surface.

As shown in FIGS. 1-3, the mud mixer 10 includes a first, primary handle 74, which is fixed with respect to the tool body 38, and a second, auxiliary handle 78, which is selectively moveable with respect to the tool body 38 (FIG. 2). The first handle 74 defines a handle axis 82. As shown in FIG. 1, when the second handle 78 is in a first position where it is set opposite of, or 180 degrees from the first handle 74, the second handle 78 lies along the handle axis 82, such that the first and second handles 74, 78 are in-line along the handle axis 82. The in-line arrangement makes it easy for an operator to hold the first and second handles 74, 78 and operate the mud mixer 10. As shown in FIGS. 1 and 2, both the first handle 74 and the second handle 78 are arranged within a plane 84 that is an expansion of the handle axis 82 in a direction perpendicular to the rotation axis 22 and the length of the tool body 38. No matter how the operator moves the second handle 78 with respect to the tool body 38, the second handle 78 remains within the plane 84. The second handle 78 has a 180 degree range of movement, e.g. rotation, about the tool body 38, corresponding to the toothed surface 50 having a circumferential range that is nominally greater than 180 degrees around the gear case 46. As shown in FIGS. 2 and 15 and explained in further detail below, the second handle 78 is moveable within the plane 84 from the first position to a second position in which the second handle 78 is not in-line with the first handle 74 (i.e., moved off the handle axis 82).

Figure 4:
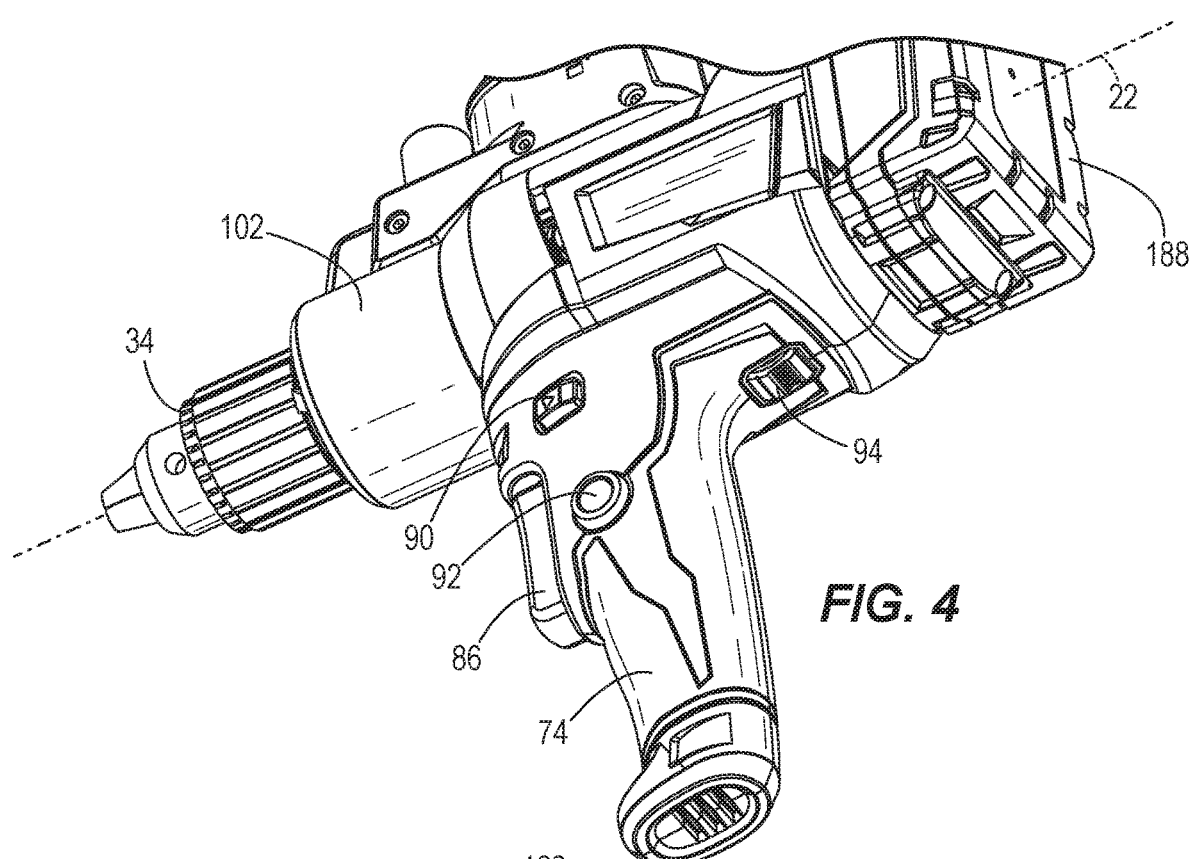
FIG. 4 is a bottom perspective view of the mud mixer of FIG. 1.

As shown in FIG. 4, the first handle 34 includes a trigger 86, a slide switch 90, a lock-on button 92, and a rotatable dial 94. Together these input controls may be used jointly or separately to control functions of the mud mixer 10, such as turning the motor 26 on and off, rotating the mixing element 36, reversing rotation of the mixing element 36, and increasing or decreasing the speed of rotation. The lock-on button 92 permits the operator to operate the mud mixer 10 without needing to continuously depress the trigger 86. The trigger 86 is biased to an extended "off" position in which the motor 26 is not actuated, and is depressible to an "on" position in which the motor 26 is actuated.

When an operator fully depresses and holds the trigger 86 in the "on" position, then presses and holds the lock-on button 92, then releases the trigger 86 before releasing the lock-on button 92, the lock-on button 92 mechanically prevents the trigger 86 from returning to the extended "off" position by holding the trigger 86 in a partially-depressed "locked-on" position in which the motor 26 runs without the operator needing to hold the trigger 86. To unlock the trigger 86 from this "locked-on" position, the operator fully depresses the trigger 86 again, which causes the lock-on button 92 to disengage from the trigger 86, thus allowing the trigger 86 to return to the extended "off" position once the operator releases the trigger 86 again.

Figure 7:
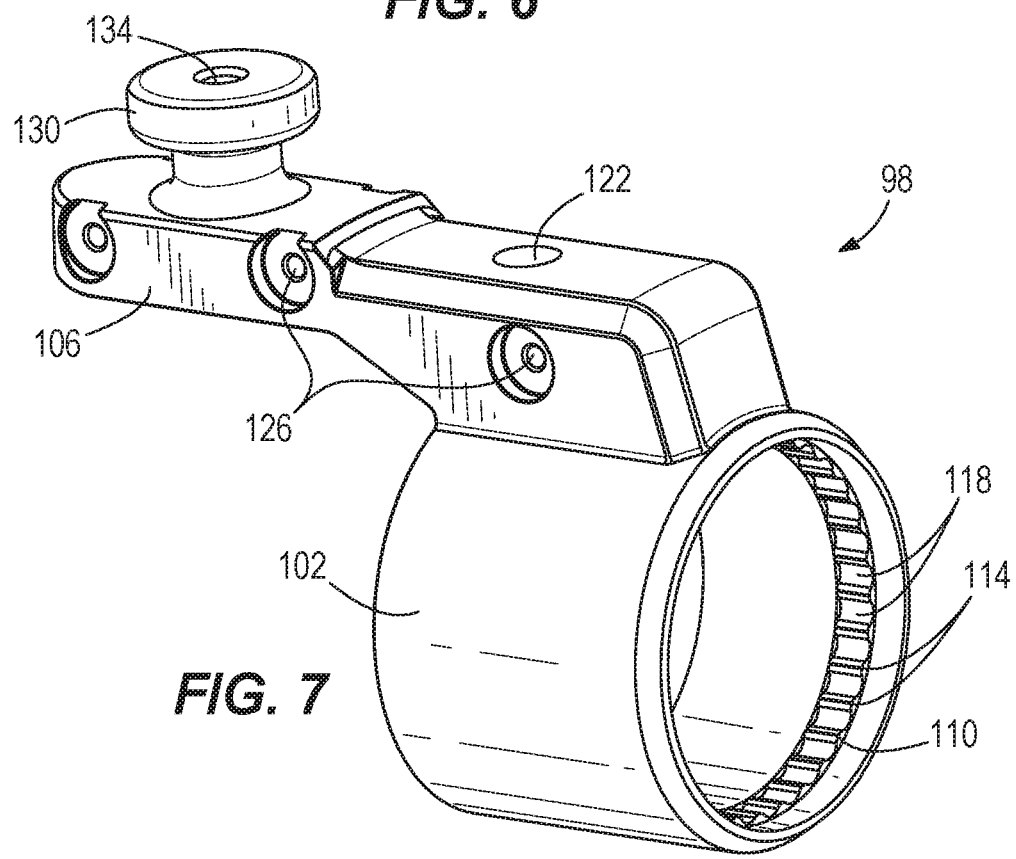
FIG. 7 is a perspective view of a collar of the mud mixer of FIG. 1.
Figure 8:
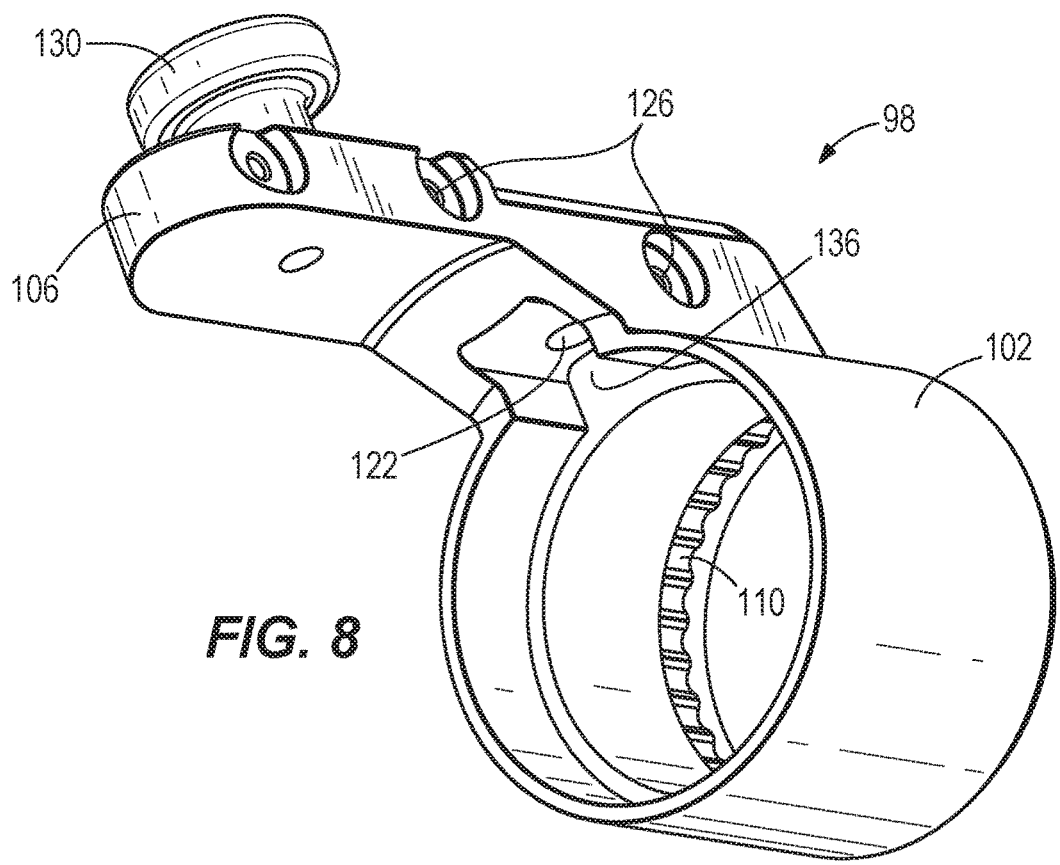
FIG. 8 is another perspective view of a collar of the mud mixer of FIG. 1.

As shown in FIGS. 1, 2 and 6-8, the mud mixer includes a collar 98 that is selectively moveable about the mud mixer 10. As shown in FIGS. 7 and 8, the collar 98 has a cylindrical portion 102 and an arm 106 extending rearward from the cylindrical portion 102. The cylindrical portion 102 is arranged about the gear case 46 of the mud mixer and has an inner circumferential ribbed surface 110 with peaks 114 and valleys 118. Each of the valleys 118 is configured to receive the nipple 70 of one of the biasing members 62. The collar 98 defines a lock bore 122 that extends through the arm 106. In some embodiments, the lock bore 122 is threaded. The arm 106 has fastener holes 126 and a hub 130 with a recess 134. The lock bore 122 leads to a plate recess 136 that is disposed between the arm 106 and the cylindrical portion 102.

The second handle 78 includes a lock lever 138 that is pivotable between a first, locked position, shown in FIGS. 1 and 5, and a second, unlocked position (not shown). The second handle 78 also includes a shoulder screw 142 shown in FIG. 5 that is coupled to the lock lever 138 such that rotation of the lock lever 138 causes rotation of the shoulder screw 142. The shoulder screw 142 extends through the second handle 78, through the lock bore 122 and into the plate recess 136 of the collar 98. A lock member, such as engagement plate 146, is disposed within the plate recess 136, such that the engagement plate 146 selectively engages and disengages the toothed portion 50 of the gear case 46 when the shoulder screw 142 respectively moves in and out of the plate recess 136. The engagement plate 146 includes protrusions 150 that are adapted to selectively and lockingly engage in the valleys 58 of the toothed portion 50. In other embodiments, the shoulder screw 142 is removed and the engagement plate 146 independently moves towards and away from the toothed portion 50 when the second handle 78 is rotated, by virtue of its position in the plate recess 136 and the protrusions 150 interfacing with the peaks 54. In yet other embodiments, the engagement plate 146 is removed and the shoulder screw 142 acts as a lock member that directly interfaces with the toothed portion 50 to selectively lock and unlock the collar 98.

Figure 11:
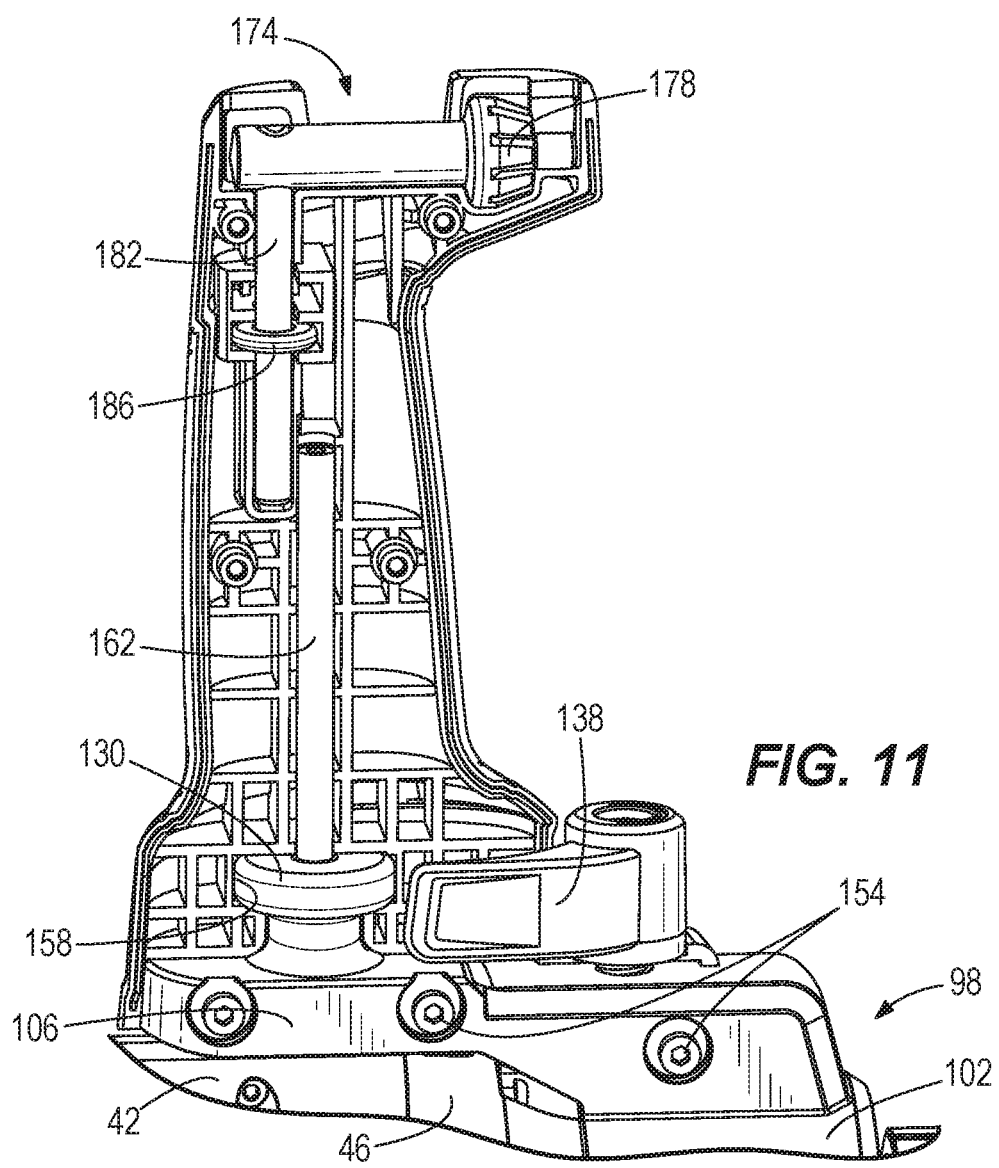
FIG. 11 is an enlarged side plan view of the mud mixer of FIG. 1, with portions removed.

As shown in FIG. 1, the second handle 78 also includes coupling fasteners 154 adapted to couple to the second handle 78 to the collar 98, via the fasteners' 154 engagement in the fastener holes 126 in the arm 106 of the collar 98. As shown in FIG. 11, the interior of the second handle 78 includes a hub recess 158 adapted to receive the hub 130 of the collar's arm 106. An elongated hub fastener 162 fixed along the interior length of the second handle 78 threadably engages the recess 134 so as to secure the second handle 78 to the collar 98 along the length of the second handle 78 and give the second handle 78 additional rigidity, for example, in case the mud mixer 10 is dropped. The shoulder screw 142, the coupling fasteners 154, the lodging of hubs 130 in the hub recess 158, and the hub fastener 162 in the recess 134 securely couple the second handle 28 to the collar 98 for selective movement about the tool body 38 with the collar 98.

Figure 9:
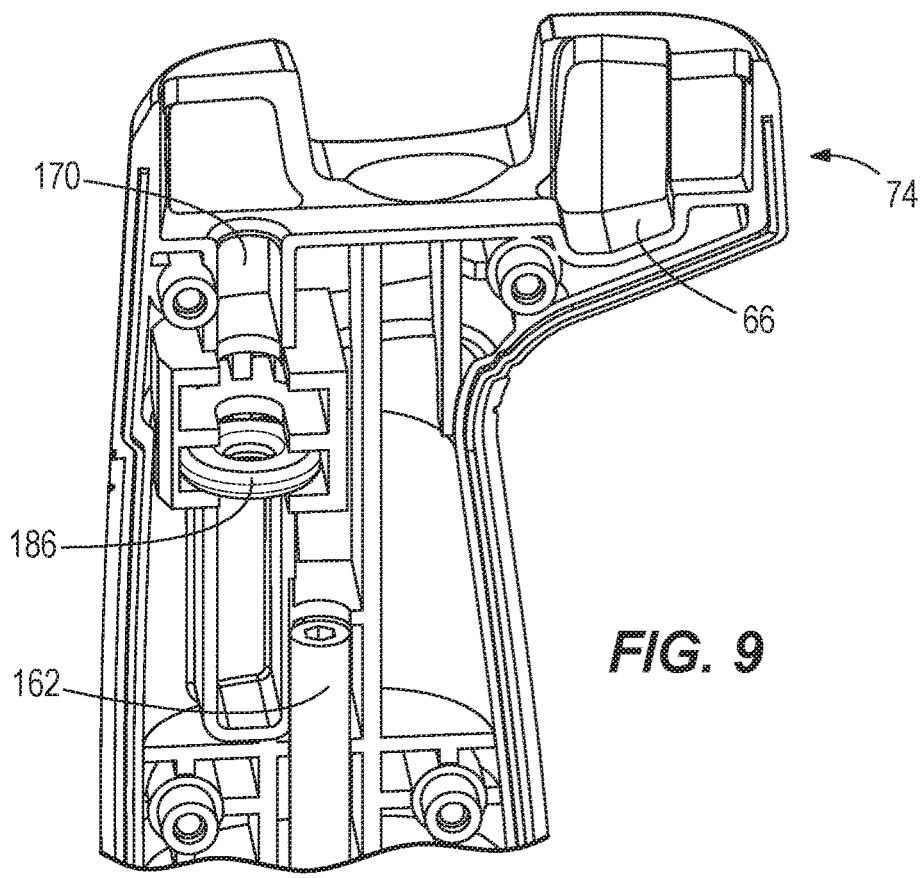
FIG. 9 is an enlarged perspective view of a second handle of the mud mixer of FIG. 1, with portions removed.
Figure 10:
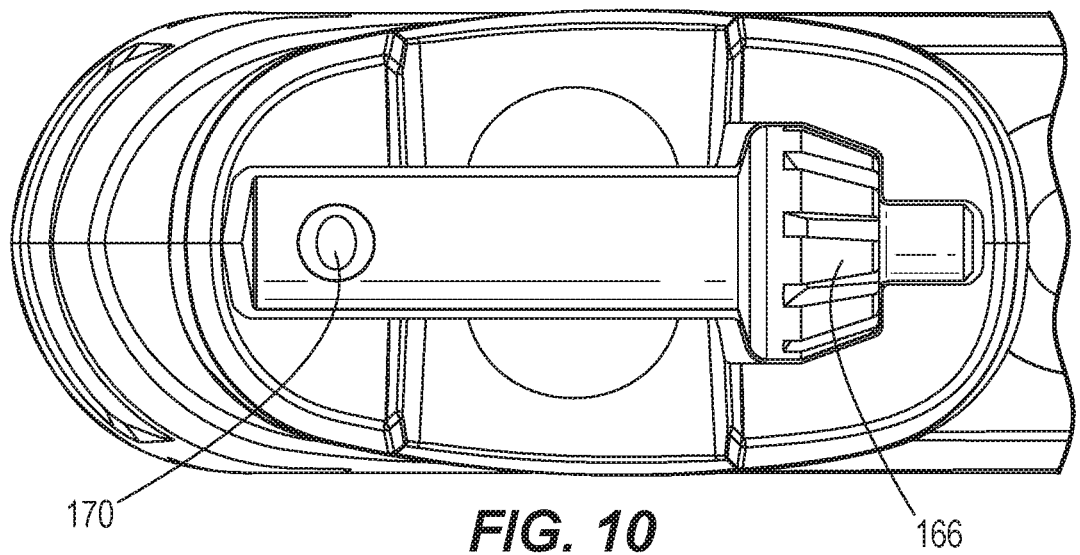
FIG. 10 is a top-down enlarged plan view of a second handle of the mud mixer of FIG. 1.

As shown in FIGS. 9-11, an outermost portion of the second handle 78 defines an interior key recess 166 and a bore 170, which can secure a chuck key 174. As is understood by persons of skill in the art, the chuck key 174 can tighten the chuck 34 to secure the mixing element 36 within the chuck 34 or loosen the chuck 34 to allow removal of the mixing element 36 from the chuck 34. The chuck key 174 includes a toothed portion 178 and a rod portion 182. As shown in FIGS. 9-11, the key recess 166 is shaped such that the toothed portion 178 of the chuck key 174 fits within the key recess 166. The rod portion 182 of the chuck key 174 slides into the bore 170 and secures the chuck key 174 in the second handle 78 via a retention mechanism 186, which is arranged around a perimeter of the bore 170. In the illustrated embodiment, the retention mechanism 186 is an O-ring that creates friction fit against the rod portion 182, which prevents the rod portion 182 from slipping out and thereby holds the chuck key 174 in the second handle 78. However, in other embodiments the retention mechanism 186 can be anything capable of permitting a frictional fit for the chuck key 174. Thus, the chuck key 174 for the chuck 34 of the mud mixer 10 is always available and accessible via the second handle 78, but it is securely stored out of the way when an operator does not need it.

The mud mixer 10 is powered by a battery pack 188 mounted in a battery mounting portion 190 at the rear of the mud mixer 10. As shown in FIG. 12, the battery mounting portion 190 is a slot 194 including rails 198 and grooves 202 configured to respectively engage with corresponding grooves and rails of the battery pack 188, to allow the battery pack 188 to be removably coupled to the battery mounting portion 190. The battery mounting portion 190 includes battery contacts 206 that are electrically coupled to a controller (not shown) within the mud mixer 10. The battery contacts 206 are arranged to contact the terminals of the battery pack 188 when the battery pack 188 is mounted in the battery mounting portion 190.

As shown in FIG. 12, the battery mounting portion 190 is arranged on the mud mixer 10 such that the rotational axis 22 of the spindle 18 intersects the battery mounting portion 190. Thus, when the battery pack 188 is mounted in the battery mounting portion 190, the rotational axis 22 intersects the battery pack 188 as well, as shown in FIG. 4. This arrangement of the battery mounting portion 190 and battery pack 188 with respect to the rotational axis 22 provides the mud mixer with a properly balanced weight distribution when an operator holds the mud mixer 10 with the first and/or second handles 74, 78. In some embodiments, the battery mounting portion 190 is also arranged such that the battery pack 188 is symmetrically arranged about the rotational axis 22 when the battery pack 188 is mounted in the mounting portion 190. In some embodiments, the battery pack 188 is arranged in horizontally symmetrical manner with respect to the rotational axis 22 and in other embodiments the battery pack 188 is arranged in vertically symmetrical manner with respect to the rotational axis 22. In still other embodiments, the battery pack 188 is arranged in a vertically and horizontally symmetrical manner with respect to the rotational axis 22.

In operation, if the operator wants to move the position of the second handle 78 with respect to the tool body, the operator rotates the lock lever 138 counter-clockwise from the locked position to the unlocked position. Rotation of the lock lever 138 causes the shoulder screw 142 to rotate counterclockwise through the lock bore 122 of the collar 98 and away from the plate recess 136. Movement of the shoulder screw 142 out of the plate recess 136 allows the engagement plate 146 to separate from the toothed portion 50, such that the collar 98 and the second handle 78 are no longer locked with respect to the tool body 38. In the embodiment where no engagement plate is utilized, the shoulder screw 142 separates from the toothed portion 50. The operator is now able to move the second handle 78 and the collar 98 with respect to the tool body 38 and about the longitudinal axis 22. As the operator moves the second handle 78, the second handle 78 stays within the plane 84.

Once the operator has decided on a new position for the second handle 78 and collar 98, the operator allows the protrusions 70 of the biasing members 62 to set within the valleys 118 of the ribbed surface 110 at the new position. The operator then rotates the lock lever 138 clockwise, causing the shoulder screw 142 to rotate clockwise through the lock bore 122, into the plate recess 136 and against the engagement plate 146. This causes the one or more protrusions 150 of the engagement plate 146 to once again engage in one or more valleys 55 of the toothed surface of the gear case 46. In the embodiment where no engagement plate is utilized, the shoulder screw 142 interfaces with the toothed portion 50 directly when the lock lever 138 is set to the locked position. The collar 98 and the second handle 78 are now locked in a new position with respect to the tool body 38, as shown in FIG. 2.

As shown in FIG. 15, when the second handle 78 is moved within the plane 84 from the first position to the second position, in which the second handle 78 is not in-line with the first handle 74 (i.e., moved off the handle axis 82), an operator may set the mud mixer 10 down such that the first handle 74, the second handle 78, and the battery pack 188 mounted in the battery mounting portion 190 all contact a support surface 210 and thereby respectively act as the three legs of a tripod, while the mixing element 36 is elevated above the support surface 210. The mud mixer 10 and the battery are weighted such that the battery pack 188, and not the mixing element 36, acts as the third leg of the tripod, in order to keep the mixing element 36 off the support surface 210 when the operator sets the mud mixer 10 down.

Various features of the invention are set forth in the following claims.

What is claimed is:

1. A mud mixer comprising:
a tool body defining a battery mounting portion;
an electric motor supported by the tool body;
a mixing element that selectively receives torque from the motor, causing the mixing element to rotate about a rotation axis;
a first handle integrally coupled to the tool body and defining a handle axis;
a second handle moveably coupled to the tool body and moveable between a first position, in which the second handle is arranged along the handle axis, and a second position, in which second handle is not arranged along the handle axis; and
a battery pack removably coupled to the battery mounting portion for providing power to the electric motor when coupled to the battery mounting portion,
wherein when the battery pack is coupled to the battery mounting portion, the rotation axis intersects the battery pack.

2. The mud mixer of claim 1, wherein the second handle is moveable about the tool body between the first and second positions within a plane that is an extension of the handle axis in a direction perpendicular to the rotation axis, and wherein the second handle has a 180 degree range of movement about the tool body with respect to the first handle.

3. The mud mixer of claim 1, wherein when the second handle is in the second position, the first handle, the second handle, and the battery pack all contact a support surface, and the mixing element is elevated above the support surface.

4. The mud mixer of claim 1, further comprising:
a chuck that selectively receives torque from the motor, causing the chuck to rotate, the chuck configured to hold the mixing element; and
a chuck key for tightening and loosening the chuck,
wherein the second handle includes a retention mechanism configured to selectively retain the chuck key.

5. The mud mixer of claim 1, wherein the battery pack is symmetrically arranged about the rotational axis when the battery pack is coupled to the mounting portion.

6. A mud mixer comprising:
a tool body;
an electric motor supported by the tool body;
a mixing element that selectively receives torque from the motor, causing the mixing element to rotate about a rotation axis;
a first handle integrally coupled to the tool body and defining a handle axis; and
a second handle moveably coupled to the tool body and moveable between a first position, in which the second handle is arranged along the handle axis, and a second position, in which second handle is not arranged along the handle axis, and wherein the second handle has a 180 degree range of movement about the tool body with respect to the first handle.

7. The mud mixer of claim 6, further comprising a collar coupled for movement about the tool body with the second handle.

8. The mud mixer of claim 7, further comprising a lock member moveable between a locked position, in which the lock member engages a surface of the tool body, such that the collar is locked to the tool body and the second handle is not moveable with respect to the tool body, and an unlocked position, in which the collar and the second handle are moveable with respect to the tool body.

9. The mud mixer of claim 7, wherein the collar includes a cylindrical portion arranged about the tool body and an arm extending from the cylindrical portion, and wherein the second handle is coupled to the arm.

10. The mud mixer of claim 9, wherein the arm includes a hub, and wherein the second handle includes a hub recess in which the hub is arranged.

11. The mud mixer of claim 10, wherein the hub includes a recess, and wherein an elongate hub fastener is fixed along an interior length of the second handle and engages the recess so as to secure the second handle to the collar.

12. The mud mixer of claim 9, wherein the collar defines a lock bore that extends through the arm, and wherein the second handle includes a lock lever moveable between a locked position, in which the second handle and the collar are not movable with respect to the tool body, and an unlocked position, in which the second handle and the collar are movable with respect to the tool body, and wherein the second handle includes a fastener extending through the lock bore toward the tool body, the fastener being coupled for movement with the lock lever, such that when the lock lever is in the unlocked position, the fastener is farther away from the tool body than when the lock lever is in the locked position.

13. The mud mixer of claim 12, wherein an engagement plate is coupled to the fastener, and wherein when the lock lever is in the locked position, the engagement plate is engaged against the tool body, and wherein when the lock lever is in the unlocked position, the engagement plate is spaced from the tool body.

14. The mud mixer of claim 13, wherein the tool body includes a toothed portion that is engaged by the engagement plate when the lock lever is in the locked position.

15. The mud mixer of claim 14, wherein the toothed portion includes a plurality of valleys, and wherein the engagement plate includes a plurality of protrusions configured to engage in the valleys when the lock lever is in the locked position.

16. A mud mixer comprising:

a tool body;

an electric motor supported by the tool body;

a chuck that selectively receives torque from the motor, causing the chuck to rotate, the chuck configured to hold a mixing element;

a first handle integrally coupled to the tool body and defining a handle axis;

a second handle moveably coupled to the tool body and moveable between a first position, in which the second handle is arranged along the handle axis, and a second position, in which second handle is not arranged along the handle axis, the second handle including an elongate bore extending parallel to or coaxial with the handle axis when the second handle is in the first position;

and a chuck key for tightening and loosening the chuck, the chuck key including a toothed portion and a rod portion that extends perpendicular to the toothed portion, wherein the the rod portion of the chuck key is selectively received in the elongate bore of the second handle.

17. The mud mixer of claim 16, wherein the second handle includes a key recess configured to receive the toothed portion of the chuck key when the rod portion is received in the elongate bore.

18. The mud mixer of claim 16, further comprising an o-ring arranged about the elongate bore, such that when the rod portion of the chuck key is received in the elongate bore, the rod portion extends through and is secured in the elongate bore by the o-ring.

* * * * *